Figure 1:
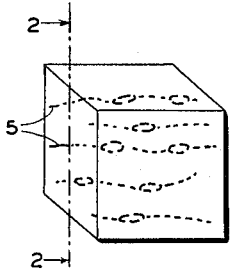

Nov. 21, 1961  G. TUKACS  3,009,289
METHOD AND MEANS FOR PROPAGATING STOLONIFEROUS
GRASSES AND THE LIKE
Filed March 2, 1960

INVENTOR.
GEORGE TUKACS
BY Bertram H Mann
ATTORNEY.

United States Patent Office 3,009,289
Patented Nov. 21, 1961

3,009,289
METHOD AND MEANS FOR PROPAGATING STOLONIFEROUS GRASSES AND THE LIKE
George Tukacs, New Milford, Conn., assignor, by mesne assignments, to Lawn Grass Pellets Company, Houston, Tex., a corporation of Delaware
Filed Mar. 2, 1960, Ser. No. 12,245
23 Claims. (Cl. 47—1)

This invention relates to an improved method and means for propagating grasses, particularly for asexually propagating stoloniferous grasses and the like.

Almost all types of bent and creeping bent grasses are propagated by means of squares or plugs of sod, which are simply transplanted, or by means of severed and/or cut up stolons, which are broadcast in the manner of seeds. Transplanting methods involve not only the cutting of the sod or plug units, but the digging of suitable cavities in the prepared earth for receiving the transplant. Such methods are so laborious, time-consuming and expensive, particularly if practiced on a large scale, as to be practically self-defeating. Moreover, such sod and plug units carry a certain amount of dirt, which presents the additional problem of excessive weight and bulk, making transportation difficult and expensive, while frequently creating difficulties with the Bureau of Entomology and Plant Quarantine due to the possible presence of insects and plant diseases carried by the soil.

The planting of chopped up or cut stolons has not proven practical since they tend to dry out and die very quickly and are easily blown away. Retention of the stolons in sod fragments is for the purpose of increasing their viability. In order to anchor cut stolons to the soil, watering has been suggested, which, however, causes the stolons to be picked up by the roller or by the shoes of workers. Moreover, it is necessary to cover the stolons with soil, yet to leave at least end portions thereof exposed to insure germination. The result is that previous efforts to plant stolons on a large scale have been inefficient and impractical.

Another serious disadvantage of previous methods of planting asexually propagated grasses is that their production and marketing necessarily have been severely limited, both in area and time. It has been necessary for golf courses and other large users of such grasses to maintain their own nearby nurseries to insure adequate supplies of sod. In short, it has been possible to market the propagating elements only in the immediate vicinity of the original growing area and very shortly after the actual cutting or digging of the elements.

Another disadvantage of prior practice in asexually propagating grasses of the above type is that in order to obtain coverage of a maximum area, plants or plugs, usually, are planted eight to ten inches apart as a matter of expediency, although it is known that close planting results in more rapid filling in of the sod.

Still other disadvantages of prior hand planting praciitce are that the introduction of new plant varieties is impeded, the rate of planting is retarded due to selection of plants by the workers, who must, therefore, have the requisite skill, and the freshly planted grounded has an uneven or pocked appearance and characteristics of row planting.

Accordingly, one object of the present invention is to provide a novel, simplified, less expensive, faster, and easier method of asexually propagating grasses, particularly stoloniferous grasses.

Another object is to provide a new method of asexually propagating grasses of the above type which greatly improves the storing, shipping, and handling properties of the sproutable elements or materials such as stolons.

Another object is to provide a novel method of planting or propagating stoloniferous grasses which shall be largely independent of local factors such as weather conditions and prevalence of plant diseases.

Another object is to provide a novel, simplified, yet entirely practical method and means for planting asexually propagated grasses on hard-to-hold embankments.

Another object is to eliminate the necessity for the planter to utilize time and skill in the selection of plants.

Another object is to provide means for planting grass stolons and the like which leaves a smooth ground surface.

Another object is to provide a novel method for vegetative or asexual propagation of grasses which permits the sproutable elements, such as stolons, to be widely distributed and to be marketed long after the units are actually cut.

Another object is to provide means for treating sproutable plant elements such as grass stolons to materially improve the viability thereof.

Another object is to provide novel means for treating sproutable elements such as grass stolons in a manner to maintain the elements in a state of dormancy for a substantial period of time so as to reduce the stress for moisture.

Another object is to provide means for resisting the evaporation of moisture from a sproutable element such as a grass stolon.

Still another object is to provide a carrier for grass stolons and other sproutable elements which is relatively durable in handling, shipping, and sowing, which does not injure the sproutable element, but, in fact, improves its viability, and which will readily and fairly rapidlly disintegrate when exposed to weathering and moisture to free the incorporated element for germination.

According to my present invention, asexually sproutable elements such as grass stolons are cut or chopped into relatively short pieces and then coated with a sealing material such as powdered gypsum (land plaster) to seal cuts and prevent rot. The coated stolons are then embedded in pellets or other discrete or separate bodies of various shapes and, conveniently, on the order of one-half inch to one and one-half inches in maximum dimension. The mass of the embedding body is substantially greater than that of the embedded material.

In the accompanying drawing, FIGS. 1, 2, 3 and 4 are perspective views of diereffnt forms of the pellets.

Figure 2:
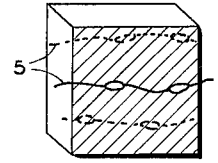

FIG. 2 is a section taken substantially on the line 2—2 of FIG. 1.

The pellets are made of various materials, as will be described in detail, largely organic, which form a hard, non-compacted, non-injurious, shell capable of protecting the enclosed plant parts during substantial storage and distribution periods and during showing either by hand or by machine. More specifically, my method provides for cutting and collecting the stoloniferous grasses in dry weather (after the stolons have adequately matured but before germination), and leaving the mother grass plants to grow again. Alternatively, the plants may be pulled up and the stolons thereafter cut off into one-half inch or three-fourths inch lengths to give maximum growth potential.

During the preparation period, the cut grass stolons should be maintained under humid conditions of relatively low temperature to maintain dormancy. The stolons are then coated, conveniently by a spraying process, with powdered gypsum, by preference, or with a wax spray which may be of the following exemplary formula, all proportions being by volume:

| | Parts |
|---|---|
| Paraffin wax | 16 |
| Powdered raw gelatine | 3 | to which is added 48 parts of water; the gelatine and water to be mixed into a thin jelly before mixing the jelly with the paraffin wax.

This coating serves to maintain the stolons in a condition of viability and to prevent rotting and to seal injured parts. The spray method tends to leave the ends of the stolons uncoated to permit breathing.

The coated stolons are then incorporated in pellets, which, satisfactorily, may consist of the following ingredients in the proportions by volume noted:

| | Parts |
|---|---|
| Sphagnum moss | 2 |
| Corn starch (powdered) | 1/10 |
| Raw gelatine | 1/10 |
| Vermiculite | 2 |
| Water. | |

The above formula is preferable when the pellets are to be sowed or planted rather promptly. Alternatively, the following ingredients may be used, all proportions, again, being by volume:

| | |
|---|---|
| Sphagnum moss (coarse) | 2 |
| Corn starch (powdered) | 1 |
| Molasses (liquid) | 1/2 |
| Raw gelatine | 1 |
| Water. | |

In both cases sufficient water is added to bring the mixture to a mastic or doughy consistency. Such mixture may be made in quantities with a cement mixer, conveniently operated on a wet floor to maintain a humid atmosphere.

The Sphagnum moss serves as discrete (granular or fibrous) material to maintain the pellets in porous, non-compacted, airy condition and, disintegrates when exposed to weathering. Other discrete or porous, more or less readily disintegrating or weathering substances may be substituted for the purpose or added to the mixture. The gelatine serves as a moisture retainer and contributes to the airiness of the pellets. It also prevents the shell from drying out during the making of the pellets. The corn starch acts as a binder and provides hardness and body. Other starches may be substituted. The vermiculite provides body and contributes to the moisture retaining and hygroscopic properties of the shell. Other granular, hygroscopic, non-compacting, earthy material such as sub-bentonite clay may be used. Fungicides and insecticides also may be added.

The doughy mixture is then formed, conveniently by machine, into pellets of spherical, spheroidal, ellipsoidal or cylindrical shape, or rolled and cut into such cylinders, in each case the pellet being, preferably, on the order of one-half inch to one and one-half inches in thickness. All pellets containing a sproutable element of the same type of grass should be of uniform distinctive shape or otherwise distinctively appearing, as by coloring, for ready identification. A number of stolons, preferably five to ten pieces to insure viability, may have the covering rolled around them in a single pellet or may be buried or immersed by pushing into the pellets while in soft and pliable condition. It is important that an end portion of each stolon piece remain exposed in order for it to breathe and remain alive. If bent, or U-shaped pieces are embedded in the pellets, there will be two ends exposed. Preferably, the outside surface of the pellets should be kept rough so that water will adhere and penetrate after planting. However, the surface of the finished pellet is not sticky and is sufficiently dry and hard to permit packaging the pellets in cardboard cartons.

I also contemplate coloring the pellets by suitable non-deleterious dyes, a different color for each different grass variety to distinguish them, thus facilitating recognition and use of a single variety or a mixture of varieties simply by observation. Moreover, the coloring, in contrast to the earth color, will indicate at a glance the distribution of the pellets.

Figure 3:
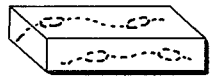
Figure 4:
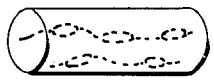

The figures represent pellets of various shapes, FIG. 1 being cubical, FIG. 3 a broad, thin polygon, and FIG. 4 being cylindrical. In each case, the embedding or pelletizing material has substantially greater mass than the embedded stolons or the like so that the pellets have sufficient body to adequately protect the embedded elements, to facilitate sowing, to resist dissipation by wind action, and to provide a favorable environment for sprouting. Each stolon piece has at least one surface, preferably a cut end, exposed on a surface of its pellet, as at 5 in FIGS. 1 and 2. In practice the pellets will assume the matted or packed appearance of their major ingredients and their edges will not be as smooth as they appear in the drawings.

In planting the pelleted stolons, the ground is first broken up and raked to a desired smoothness, as preparatory to seeding. Fertilizer should be applied according to the manufacturer's directions. The pellets are then distributed or broadcast at least two per square foot. If fast coverage is the aim, pellets may be distributed four or five to the square foot. After distribution, the pellets are forced against the soft soil by a medium weight roller or in small areas, they may be stepped on lightly. The pellets are flattened into close adherence to the earth, but do not stick to the roller, as would the loose stolon pieces. Following this, the area should be well sprinkled and kept in moist condition until the grass emerges.

On established lawns, a new lawn with the same or with an entirely different variety of grass may be constructed using the pellets. The old lawn should be mowed close; clippings may be left on the ground. Then add a one-inch dressing of top soil. After fertilization, the pellets are broadcast and rolled and the area is sprinkled. This method, besides avoiding the expense of plugging, digging, etc., adds to soil fertility and assures complete coverage very quickly.

I have found that pellets, as herein described, may be preserved in perfect condition for a long time. This, of course, permits preparation of the pellets at any convenient location, their display, and their distribution to various points for sale. Stoloniferous grasses may be supplied in large quantities and at great distances, as for replanting golf courses and hard-to-hold embankments and roadsides, so that such points no longer are at the mercy of local conditions. Nor is such shipment any longer either risky or strictly seasonal. Moreover, the germinating efficiency of the herein described pelleted units is extremely high, at least 95%. While the success of hand planting depends entirely upon the planter, pelleted stolons require no skill or knowledge of planting or of any physical strains.

The novel method and means herein described has made entirely practical and economical the preserving, storing, shipping and planting of vegetatively propagated grasses, an art heretofore completely neglected. The word "stolon" as herein used is intended to include runners, off-shoots, or roots, both above and below ground, which may be used in asexually or vegetatively propagating the grass. The words, "mass" and "pellet" and "pelletized mass" refer to bodies of the particular substance or material having substantial thickness, as distinguished from coatings and films. The methods and means may be modified as will occur to those skilled in the art and the exclusive use in all modifications as come within the scope of the appended claims is contemplated.

I claim:
1. In the propagation of grass, the step of embedding an asexually sproutable element of the grass in a discrete body of non-compacted, form sustaining, non-injurious material to preserve and safeguard the element and adapt it for controlled distribution in planting, the mass of said body being substantially greater than that of the embedded element.

2. In the propagating of stoloniferous grass, the step of embedding an asexually sproutable stolon or like element of the grass in a pelletized body of form-sustaining, non-injurious material which is readily disintegrated by weathering and moisture, the mass of said body being substantially greater than that of the embedded element.

3. The method step of claim 2 with the further step of sowing the pellet on the surface of prepared ground and applying sufficient pressure to the pellet to cause intimate association of the embedded element with the ground to expedite sprouting.

4. In the asexual propagation of grass, the steps of coating the cut stolons with sealing material to maintain viability and resist loss of moisture, and embedding the stolon pieces in pelletized masses of form sustaining, non-compacted, non-injurious material for preserving and safeguarding the stolon pieces and adapting them for controlled distribution.

5. In the propagation of stoloniferous grass, the steps of coating with sealing material pieces of stolons and like grass capable of asexual sprouting, and pelletizing the coated elements in form sustaining non-compacted, non-injurious masses capable of disintegration under weathering and sprouting conditions.

6. In asexual propagation of stoloniferous grass, the steps of coating cut stolons or like sproutable grass parts to preserve viability, and pelletizing the coated part in a mastic comprised substantially of two parts by volume each of sphagnum peat moss and vermiculite, one-tenth part by volume each of corn starch and raw gelatine, and sufficient moisture to form a mastic of doughy consistency.

7. The method described in claim 6 in which a plurality of cut pieces of grass stolons are embedded in each pellet.

8. In asexual propagation of grass, the steps of cutting grass stolons into short pieces, coating the pieces with a sealant, and embedding one or more of the coated pieces in a mastic comprising approximately two parts by volume each of sphagnum moss and vermiculite, approximately one-tenth part by volume each of corn starch and raw gelatine, and sufficient moisture to form a doughy mass.

9. The method described in claim 8 in which the stolon pieces are initially coated with powdered gypsum.

10. In asexual propagation of grass, the steps of cutting grass stolons into short pieces, coating the pieces with a sealant, and pelletizing the coated pieces in a mastic comprising substantially two parts of peat moss, one part each of corn starch and raw gelatine, one-half part molasses and sufficient water to produce a doughy mass.

11. A pellet for use in asexually propagating stoloniferous grass comprising a piece of grass stolon or like sproutable grass part and a cohesive covering body of substantial mass compared to the mass of the grass part comprising approximately ninety-six percent by volume of one or both of the discrete non-compact materials of the group consisting of sphagnum peat moss and vermiculite, approximately two percent each, by volume of starch and raw gelatine, and sufficient water to form a doughy mastic.

12. A pellet as described in claim 11 in which the grass part has a coating to maintain viability and resist the loss of moisture.

13. A pellet as described in claim 12 in which the coating comprises powdered gypsum.

14. A pellet as described in claim 12 in which a plurality of cut grass stolons are embedded in the pellet body.

15. A pellet as described in claim 12 in which the covering body is comprised of approximately forty-eight percent by volume each of sphagnum moss and vermiculite and the balance of substantially equal quantities of corn starch and raw gelatine and water.

16. In the asexual propagation of stoloniferous grass, the step of pelletizing stolons or like sproutable elements of the grass in a mastic containing one or both discrete, non-compact substances of the type consisting of sphagnum moss and vermiculite, a relative small quantity of raw gelatine, a quantity of starch, and sufficient water to form a mastic of doughy consistency.

17. The method of asexual propagation of grass, as described in claim 16, in which the sproutable elements are coated with a sealant.

18. The method of asexual propagation of grass, as described in claim 16, including the preliminary step of coating the sproutable elements with a thin, jelly-like mixture of gelatine, parafine wax and water.

19. In the propagation of stoloniferous grass, the steps of forming a doughy mastic consisting of a mixture of discrete, non-compacted, noninjurious, at least partially organic material, and a binder, which upon setting forms a cohesive mass and which will disintegrate upon exposure to moisture and/or weathering, adding asexually sproutable elements of the grass to the mastic and forming and cutting said mastic into discrete bodies with an end of each sproutable element exposed on the surface of its embedding body, each of said bodies having a mass substantially greater than that of the contained sproutable element or elements.

20. In the propagation of stoloniferous grass, the steps of forming a doughy mastic consisting of a mixture of one or more discrete, non-compact, light-weight materials of the class consisting of sphagnum moss, vermiculite, and sub-bentonite clay, one or both of the cohesively setting binder substances of the class consisting of starch and raw gelatine, and sufficient water to form a mixture of doughy consistency, adding stolons or like asexual sproutable grass elements to said mastic and segregating and forming the mastic into pellets each of said sproutable elements having an end exposed on the surface of its pellets, each of said pellets having a mass substantially greater than the mass of the contained grass element or elements, and drying said pellets and allowing the same to congeal.

21. A pelletized mass for use in propagating stoloniferous grasses comprising a dry, cohesive covering containing a majority of one or more of the discrete, light-weight, non-compact substances of the class consisting of sphagnum moss, vermiculite, and sub-bentonite clay, one or more of the binder substances of the class consisting of starch and gelatine, and water, and also containing one or more cut stolons or like asexually sproutable grass elements with a cut end exposed on the surface of the pellet, the mass of said covering material being substantially greater than that of the contained grass element.

22. A pellet for use in propagating stoloniferous grass comprising a substantially dry, cohesive, covering of lightweight, non-compact, non-injurious material subject to disintegration when exposed to moisture and/or weathering, one or more cut stolons or like asexually sproutable grass elements embedded in said covering, and visible, type-indicating means on said pellet, the mass of said pellet being substantially greater than that of the embedded grass element or elements to facilitate controlled sowing and to form a growth stimulating bed on the ground.

23. A pellet as described in claim 22 in which said covering contains one or more of the class of non-compact substances consisting of sphagnum moss, vermiculite and sub-bentonite clay, one or both of the binders of the class consisting of starch and gelatine, and sufficient water to form a doughy mastic prior to setting.

References Cited in the file of this patent

UNITED STATES PATENTS

| | | |
|---|---|---|
| 1,486,431 | Harvey | Mar. 11, 1924 |
| 2,083,065 | Heyl | June 8, 1937 |
| 2,235,950 | St. John | Mar. 25, 1941 |
| 2,579,734 | Burgesser | Dec. 25, 1951 |

FOREIGN PATENTS

| | | |
|---|---|---|
| 522,525 | Germany | Apr. 10, 1931 |
| 641,280 | Great Britain | Aug. 9, 1950 |
| 741,378 | Great Britain | Nov. 30, 1955 |

OTHER REFERENCES

Publication: "The Complete Garden Handbook" (Simon et al.), published by Van Nostrand (N.Y.), 1950. Page 234 relied on.